US009783189B2

(12) United States Patent
Miki

(10) Patent No.: US 9,783,189 B2
(45) Date of Patent: Oct. 10, 2017

(54) CONTROL APPARATUS FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Hironori Miki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/133,746

(22) Filed: Apr. 20, 2016

(65) Prior Publication Data

US 2016/0311425 A1 Oct. 27, 2016

(30) Foreign Application Priority Data

Apr. 24, 2015 (JP) ................................. 2015-089392

(51) Int. Cl.
| | |
|---|---|
| *B60W 20/00* | (2016.01) |
| *B60W 20/14* | (2016.01) |
| *B60W 10/184* | (2012.01) |
| *B60W 10/26* | (2006.01) |
| *B60W 30/18* | (2012.01) |

(52) U.S. Cl.
CPC .......... *B60W 20/14* (2016.01); *B60W 10/184* (2013.01); *B60W 10/26* (2013.01); *B60W 30/18127* (2013.01); *B60W 2710/248* (2013.01); *B60Y 2300/89* (2013.01)

(58) Field of Classification Search
CPC ........... B60W 20/14; B60W 2510/244; B60W 10/08; B60W 10/06
See application file for complete search history.

(56) References Cited

U.S. PATENT DOCUMENTS

2011/0127958 A1* 6/2011 Ishishita ............. B60L 11/1862
320/109

FOREIGN PATENT DOCUMENTS

WO 2010/005079 A1 1/2010

* cited by examiner

*Primary Examiner* — Yuen Wong
(74) *Attorney, Agent, or Firm* — Oliff PLC

(57) ABSTRACT

An electronic control unit is configured to: i) calculate a restriction target value of input electric current to a battery depending on detection value of a current sensor, in a charge control of charging the battery such that charging electric power to the battery is below a permissible value, ii) calculate voltage value of the battery when the battery is charged based on the restriction target value, in a case where the detection value exceeds the restriction target value, iii) calculate a basic permissible value of the charging electric power to the battery, from the restriction target value and the voltage value, and iv) set a regeneration restriction rate to a higher value, as a difference value between the restriction target value and the detection value increases, or as at least one of vehicle speed and the charging electric power when the detection value exceeds the restriction target value increases.

2 Claims, 9 Drawing Sheets

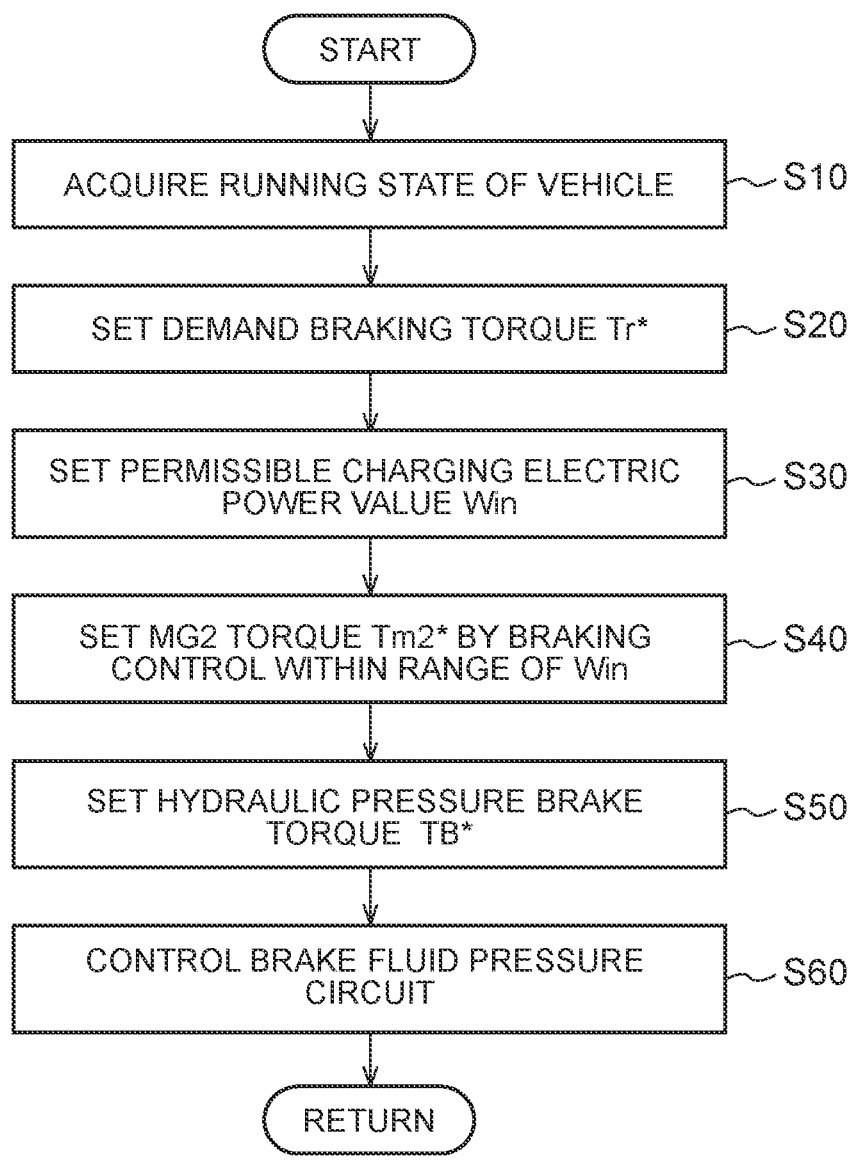

CONTROL APPARATUS FOR VEHICLE AND CONTROL METHOD FOR VEHICLE

INCORPORATION BY REFERENCE

The disclosure of Japanese Patent Application No. 2015-089392 filed on Apr. 24, 2015 including the specification, drawings and abstract is incorporated herein by reference in its entirety.

BACKGROUND OF THE INVENTION

1. Field of the Invention

The invention relates to a control apparatus for a vehicle and a control method for a vehicle, and more specifically, relates to a control apparatus for a vehicle including a battery that is configured to be chargeable with regenerative electric power, and a control method for the vehicle.

2. Description of Related Art

For a battery that is mounted on a hybrid vehicle, an electric vehicle or the like, there has been proposed a charge control for protecting the battery from an excessive charging electric power. For example, in a case where a lithium-ion secondary battery is employed as the battery, there is known a phenomenon in which lithium ion in an electrolytic solution precipitates on an anode as lithium metal when an excessive electric current is input to the battery. For example, International Publication No. WO 2010/005079 discloses that an allowable value Ilim (a permissible input electric current value in International Publication No. WO 2010/005079) of the input electric current is set as the maximum of the input electric current that does not cause the precipitation of lithium metal (for example, see Paragraph [0022] in International Publication No. WO 2010/005079).

For protecting the battery, it is desirable to execute the feedback control of input electric current IB such that the absolute value of the input electric current IB to be detected by a current sensor does not exceed the allowable value Ilim. However, generally, there is a delay time in feedback control. Accordingly, when the input electric current IB is restricted after the input electric current IB reaches the allowable value Ilim, there is a possibility that the absolute value of the input electric current IB exceeds the allowable value Ilim and the battery cannot be adequately protected. Therefore, in consideration of the delay time in feedback control, a restriction target value Itag for which a predetermined amount of margin is secured relative to the allowable value Ilim is calculated (for example, see Paragraph [0030] in International Publication No. WO 2010/005079).

In International Publication No. WO 2010/005079, $Kp \times \int (Itag-IB)dt$ is calculated, using the difference value between the input electric current IB and the restriction target value Itag, and a coefficient Kp. As shown in the following Formula (A), the term is subtracted from a base electric power Winb that is a basis of the upper limit of charging electric power, and thereby, a permissible charging electric power value Win is set (see Paragraph [0053] in International Publication No. WO 2010/005079).

$$Win = Winb - Kp \times \int (Itag - IB)dt \quad (A)$$

However, International Publication No. WO 2010/005079 describes the coefficient Kp only as a feedback gain, and therefore, does not disclose a detailed configuration for setting the term (see Paragraph [0055] in International Publication No. WO 2010/005079). Accordingly, there is room to optimize the coefficient Kp.

More specifically, at the time of regenerative braking in a hybrid vehicle, an electric vehicle or the like, the regenerative electric power depending on the running situation of the vehicle is generated by a motor generator, and the battery is charged. When the absolute value of the permissible charging electric power value Win is set to an excessively small value, the charging electric power is strictly restricted, and as a result, there is a possibility that a sufficient regenerative electric power cannot be recovered. On the other hand, when the absolute value of the permissible charging electric power value Win is set to an excessive large value, there is a possibility that the battery is charged with an excessive electric power.

SUMMARY OF THE INVENTION

The invention provides a technology for adequately restricting charging electric power depending on vehicle running situation, in a vehicle including a battery that is configured to be chargeable with regenerative electric power.

In a control apparatus for a vehicle according to an aspect of the invention, the vehicle includes a rotating electric machine to generate regenerative electric power by regenerative braking, a battery configured to be chargeable with the regenerative electric power from the rotating electric machine, and a current sensor to detect input and output electric current for the battery. The control apparatus includes an electronic control unit configured to calculate a restriction target value of input electric current to the battery depending on a detection value of the current sensor, in a charge control of charging the battery such that charging electric power to the battery is below a permissible value. The electronic control unit calculates a voltage value of the battery when the battery is charged based on the restriction target value, in a case where the detection value exceeds the restriction target value, calculates a basic permissible value of the charging electric power to the battery, from the restriction target value and the voltage value, and sets a regeneration restriction rate to a higher value, as a difference value between the restriction target value and the detection value increases, or as at least one of vehicle speed and the charging electric power when the detection value exceeds the restriction target value increases, the regeneration restriction rate being a change amount of the permissible value per unit time at the time of the regenerative braking.

In a control method for a vehicle according to another aspect of the invention, the vehicle includes a rotating electric machine to generate regenerative electric power by regenerative braking, a battery configured to be chargeable with the regenerative electric power from the rotating electric machine, and a current sensor to detect input and output electric current for the battery. The control method includes: i) calculating a restriction target value of input electric current to the battery depending on a detection value of the current sensor, in a charge control of charging the battery such that charging electric power to the battery is below a permissible value; ii) calculating a voltage value of the battery when the battery is charged based on the restriction target value, in a case where the detection value exceeds the restriction target value; iii) calculating a basic permissible value of the charging electric power to the battery, from the restriction target value and the voltage value; and iv) setting a regeneration restriction rate to a higher value, as a difference value between the restriction target value and the detection value increases, or as at least one of vehicle speed and the charging electric power when the detection value exceeds the restriction target value increases, the regeneration restriction rate being a change amount of the permissible value per unit time at the time of the regenerative braking.

The control apparatus may calculate a coefficient based on the charging electric power when the detection value exceeds the restriction target value and the vehicle speed, may calculate a multiplied value of the coefficient and the difference value, as the regeneration restriction rate, and may calculate the permissible value based on the basic permissible value and the multiplied value.

According to the configuration and the method, the coefficient is set based on the charging electric power and the vehicle speed. Therefore, it is possible to set the regeneration restriction rate (the change amount of the allowable charging electric power value per unit time at the time of the regenerative braking), which is the multiplied value of the coefficient and the difference value, depending on the running situation of the vehicle. For example, if the regeneration restriction rate is set to a relatively high value, the input electric current decreases quickly when the input electric current exceeds the restriction target value, and therefore, it is possible to protect the battery. Further, if the regeneration restriction rate is set to an adequate value depending on the running situation of the vehicle, the restriction target value can be set to a relatively large value, and therefore, the detection value is unlikely to exceed the restriction target value. Accordingly, it is possible to reduce the frequency at which the detection value exceeds the restriction target value (or to shorten the period during which the detection value exceeds the restriction target value), and therefore, it is possible to recover a larger regenerative electric power to the battery.

The control apparatus may set the coefficient such that a reduction amount of deceleration rate per unit time is below a predetermined value, when the deceleration rate of the vehicle is reduced by decreasing regenerative braking force of the rotating electric machine in a case where the detection value exceeds the restriction target value at the time of deceleration of the vehicle, as compared to a case where the detection value is below the restriction target value.

In the case where the detection value exceeds the restriction target value at the time of the deceleration of the vehicle, the control apparatus, for protecting the battery from an excessive regenerative electric power, decreases the regenerative braking force of the rotating electric machine, compared to the case where the detection value is below the restriction target value. An excessive decrease in the regenerative braking force greatly changes the deceleration rate of the vehicle, and therefore, there is a possibility of giving a user an uncomfortable feeling. According to the configuration, by the setting of an adequate coefficient, the reduction amount of the deceleration rate per unit time is suppressed so as to be below the predetermined value, and therefore, it is possible to prevent the generation of the uncomfortable feeling.

According to the aspects of the invention, in the vehicle including the battery that is configured to be chargeable with the regenerative electric power, it is possible to adequately restrict the charging electric power depending on the running situation of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a flowchart for describing the braking control;

DETAILED DESCRIPTION OF EMBODIMENTS

Figure 1:
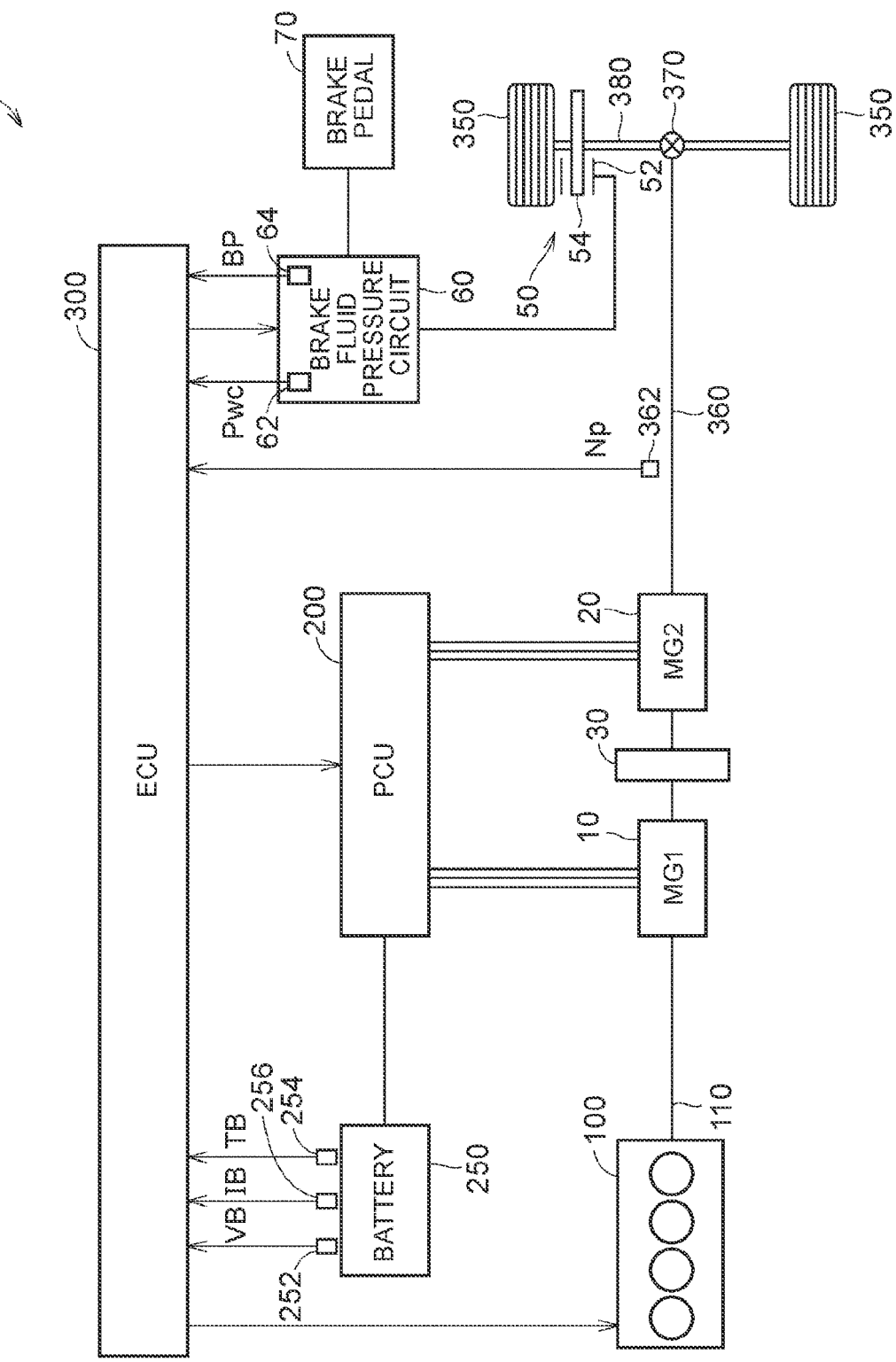
FIG. 1 is a block diagram schematically showing a configuration of a vehicle on which a control apparatus according to an embodiment is mounted.

Hereinafter, an embodiment of the invention will be described in detail, with reference to the drawings. Here, in the drawings, to identical or equivalent parts, identical reference characters are assigned, and the descriptions are not repeated.

In an embodiment described below, the description will be made, using a hybrid vehicle as an exemplary vehicle on which a control apparatus according to the invention is mounted. However, vehicles to which the invention can be applied are not limited to hybrid vehicles, as long as batteries are mounted, and may be electric vehicles or fuel-cell vehicles on which engines are not mounted.

<Vehicle Configuration> FIG. 1 is a block diagram schematically showing a configuration of a vehicle 1 on which an electronic control apparatus (ECU: Electronic Control Unit) 300 according to the embodiment is mounted. With reference to FIG. 1, the vehicle 1 includes an engine 100, a first motor generator (MG: Motor Generator) 10, a dynamic power division mechanism 30, a second MG 20, driving wheels 350, a braking apparatus 50, a brake fluid pressure circuit 60, a brake pedal 70, an electric power control unit (PCU: Power Control Unit) 200, a battery 250, and the ECU 300.

The engine 100 is a known internal combustion engine that combusts fuel and outputs dynamic power, and for example, is a gasoline engine or a diesel engine. Each of the first MG 10 and the second MG 20 is, for example, a three-phase alternating-current rotating electric machine, and is connected with the battery 250 through the PCU 200.

The PCU 200 is configured to include an inverter and a converter, which are not illustrated. The PCU 200 executes bidirectional electric power conversion between the first MG 10/the second MG 20 and the battery 250, in accordance with control signals from the ECU 300. The ECU 300 controls the PCU 200 such that output torque (MG1 torque) Tm1 from the first MG 10 coincides with a torque command value (MG1 torque command value) Tm1* for the first MG 10. Further, the ECU 300 controls the PCU 200 such that output torque (MG2 torque) Tm2 from the second MG 20 coincides with a torque command value (MG2 torque command value) Tm2* for the second MG 20.

At the time of the regenerative braking of the vehicle 1, the second MG 20 is driven by the driving wheels 350, and therefore, the second MG 20 works as an electric generator. Thereby, the second MG 20 functions as a regenerative brake that converts braking energy into electric power. The regenerative electric power generated by the second MG 20 is stored in the battery 250 through the PCU 200.

The dynamic power division mechanism 30 is configured to include, for example, a planetary gear mechanism, and mechanically links three elements of a crankshaft 110, a rotating shaft (not illustrated) of the first MG 10, and a propeller shaft 360. The dynamic power division mechanism 30 adopts one of the three elements as a reaction element, and thereby, can transmit dynamic power between the other two elements. The dynamic power output by the propeller shaft 360 is transmitted to the driving wheels 350 through a differential gear 370 and a drive shaft 380.

The propeller shaft 360 is provided with a speed sensor 362. The speed sensor 362 detects rotation speed (driving shaft rotation speed) Np of the propeller shaft 360, and outputs a signal indicating the detection result, to the ECU 300. The ECU 300 calculates vehicle speed V based on the signal from the speed sensor 362.

The braking apparatus 50 includes a brake caliper 52 and a brake disc 54. The brake caliper 52 includes a wheel cylinder and a brake pad, which are not illustrated. The brake fluid pressure circuit 60 supplies fluid pressure to the brake caliper 52, and thereby, the wheel cylinder is actuated. The actuated wheel cylinder presses the brake pad onto the brake disc 54, and thereby, the rotation of the brake disc 54 is restricted. Thereby, the braking apparatus 50 generates fluid pressure braking force depending on supplied fluid pressure Pwc from the brake fluid pressure circuit 60.

The brake fluid pressure circuit 60 includes a fluid pressure sensor 62 and a brake-pedal operation amount detection unit 64. The fluid pressure sensor 62 detects the supplied fluid pressure Pwc that is supplied from the brake fluid pressure circuit 60 to the braking apparatus 50. The brake-pedal operation amount detection unit 64 detects stepping amount BP of the brake pedal 70. Each sensor outputs the detection value to the ECU 300.

The battery 250 is a rechargeable direct-current electric power source, and is configured to include, for example, a secondary battery such as a nickel-hydrogen battery or a lithium-ion battery, or a capacitor such as an electric double layer capacitor. In the embodiment, an example in which the battery 250 is configured to include a lithium-ion secondary battery is described.

The battery 250 is provided with a voltage sensor 252, a current sensor 254 and a temperature sensor 256. The voltage sensor 252 detects voltage VB of the battery 250. The current sensor 254 detects electric current IB that is input and output for the battery 250. The temperature sensor 256 detects temperature TB of the battery 250. Each sensor outputs a signal indicating the detection result, to the ECU 300. The ECU 300 calculates the state-of-charge (SOC: State Of Charge) of the battery 250, based on the voltage VB, input/output electric current IB and temperature TB of the battery 250. As the calculation technique for the SOC, a known technique can be applied, and therefore, the detailed description is not repeated.

The ECU 300, for example, is configured to include a microcomputer that includes a CPU (Central Processing Unit), a memory, and input and output ports. At least a part of the ECU 300 may be configured to execute a predetermined arithmetic/logical operation process, with hardware such as an electronic circuit.

The ECU 300 executes the running control (including a braking control) of the vehicle 1. Further, the ECU 300 executes the charge/discharge control of the battery 250. Specifically, based on the temperature TB and SOC of the battery 250, the ECU 300 sets a permissible charging electric power value Win indicating a limiting value of the charging electric power to the battery 250, and a permissible discharging electric power value Wout indicating a limiting value of the discharging electric power from the battery 250.

Hereinafter, the input/output electric current IB for the battery 250 is shown as a positive value (IB>0) at the time of the charge of the battery 250, and is shown as a negative value (IB<0) at the time of the discharge. Also, charging/discharging electric power PB (=VB×IB) for the battery 250 is shown as a positive value (PB>0) at the time of the charge of the battery 250, and is shown as a negative value (PB<0) at the time of the discharge. Therefore, the permissible charging electric power value Win is zero or a positive value (Win≥0). The ECU 300 restricts the charging electric power PB such that the charging electric power PB to the battery 250 does not exceed the permissible charging electric power value Win.

<Regenerative Braking Force and Fluid Pressure Braking Force> The vehicle 1 executes a braking control of outputting the demand braking force (total braking force) for the whole of the vehicle based on the operation of the brake pedal 70 by a user, such that the demand braking force is shared by the regenerative braking force of the second MG 20 and the fluid pressure braking force of the braking apparatus 50.

Figure 2:
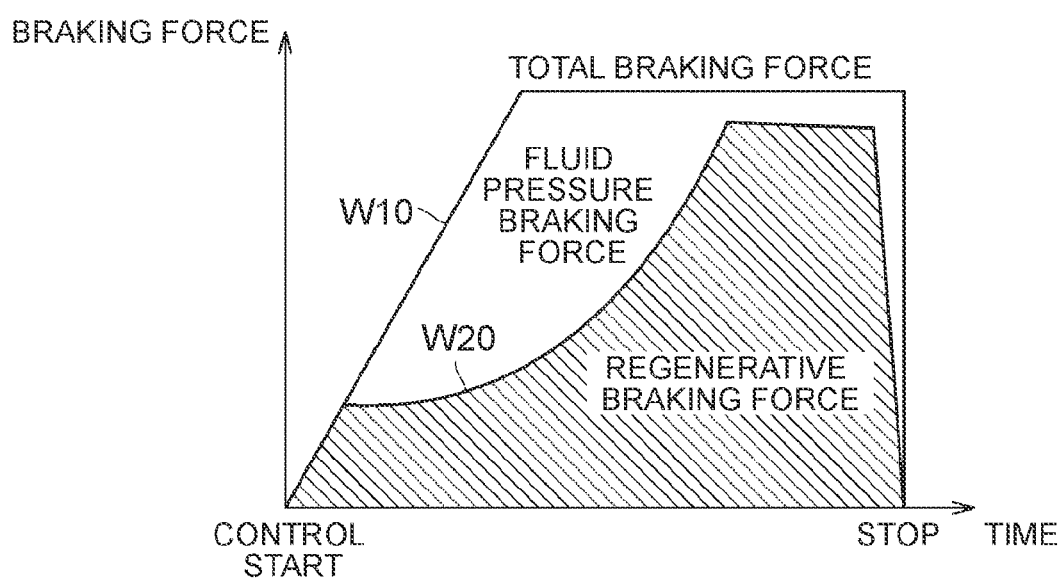
FIG. 2 is a conceptual diagram for describing a braking control.

FIG. 2 is a conceptual diagram for describing the braking control. A curve line W10 shows the total braking force based on the operation of the brake pedal 70 by the user. A curve line W20 shows the regenerative braking force to be generated by the second MG 20. With reference to FIG. 2, the total braking force is secured by the sum of the regenerative braking force and the fluid pressure braking force. Here, the vehicle 1, because of a hybrid vehicle, generates the engine braking force by the so-called engine brake, in addition to the fluid pressure braking force and the regenerative braking force. Therefore, strictly speaking, the regenerative braking force and the fluid pressure braking force are decided, in consideration of the engine braking force also. However, to facilitate the understanding of the invention, the description will be made below, on the assumption that the engine braking force is zero.

Figure 9:
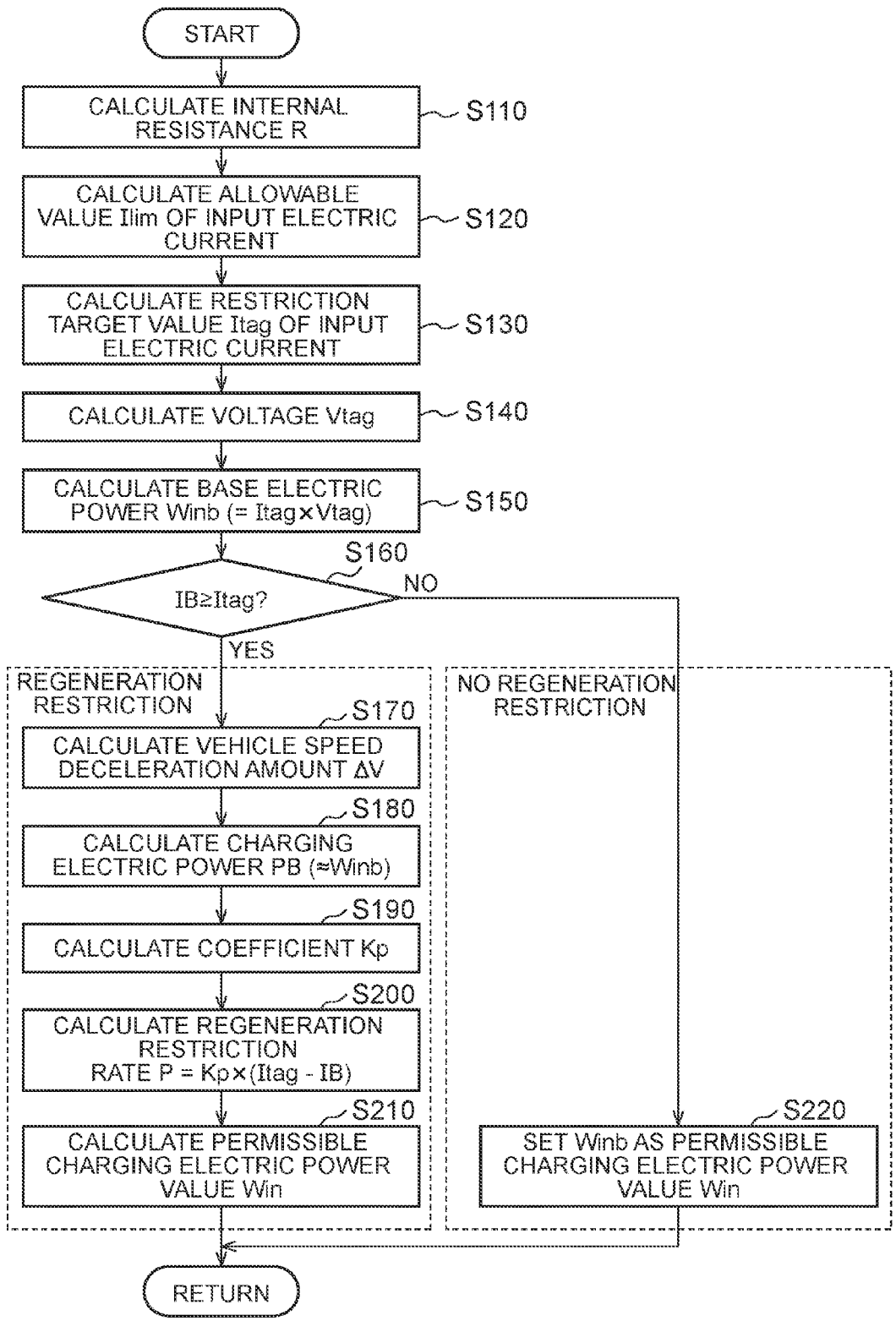
FIG. 9 is a flowchart for describing the regeneration restriction in the embodiment.

FIG. 3 is a flowchart for describing the braking control. The control in the flowcharts shown in FIG. 3 and the later-described FIG. 9 is executed by being called from a main routine by the ECU 300, at the time of the satisfaction of a predetermined condition, or in a predetermined control cycle. Here, basically, each step (hereinafter, abbreviated to S) is actualized by software processing with the ECU 300, but may be actualized by hardware processing.

With reference to FIG. 1 and FIG. 3, in S10, the ECU 300 receives the information relevant to the vehicle state of the vehicle 1, from the sensors. The information relevant to the vehicle state, for example, includes the vehicle speed V, the stepping amount BP of the brake pedal 70, the engine speed from non-illustrated sensors, and the rotation speeds of the first MG 10 and second MG 20.

In S20, the ECU 300 sets demand braking torque Tr* for the whole of the vehicle, based on the vehicle state of the vehicle 1. The demand braking torque Tr* corresponds to the total braking force described in FIG. 2, and for example, is calculated based on the vehicle speed V and the stepping amount BP of the brake pedal 70.

In S30, the ECU 300 sets the permissible charging electric power value Win of the battery 250. The setting of the permissible charging electric power value Win will be described in detail, in FIG. 5 to FIG. 9.

In S40, the ECU 300 decides the share amount for the regenerative braking torque of the demand braking torque Tr*, in accordance with the braking control described in FIG. 2. The MG2 torque command value Tm2* is set based on the share amount. As described above, it is necessary to restrict the charging electric power PB such that the charging electric power PB to the battery 250 does not exceed the permissible charging electric power value Win set in S30, and therefore, the MG2 torque command value Tm2* is set so as to be limited within the range of PB<Win.

In S50, the ECU 300 sets a fluid pressure brake torque command value TB*(TB*=Tr*−Tm2*), based on the demand braking torque Tr* and the MG2 torque command value Tm2*.

In S60, the ECU 300 calculates a target fluid pressure to be supplied to the braking apparatus 50, based on the fluid pressure brake torque command value TB*. Furthermore, the ECU 300 controls the brake fluid pressure circuit 60 such that the supplied fluid pressure Pwc to be detected by the fluid pressure sensor 62 coincides with the target fluid pressure.

<Uncomfortable Feeling Associated with Decrease in Regenerative Braking Force> When the braking control is actualized as described above, it is likely that the total braking force is changed during the deceleration of the vehicle 1. For example, when the regenerative braking force of the second MG 20 decreases during the deceleration, the total braking force is likely to decrease. Then, the deceleration rate is reduced (the deceleration is weakened) during the deceleration, and therefore, there is a possibility of giving the user an uncomfortable feeling. The inventors performed the validation by having users experience various changes in deceleration rate.

Figure 4A:
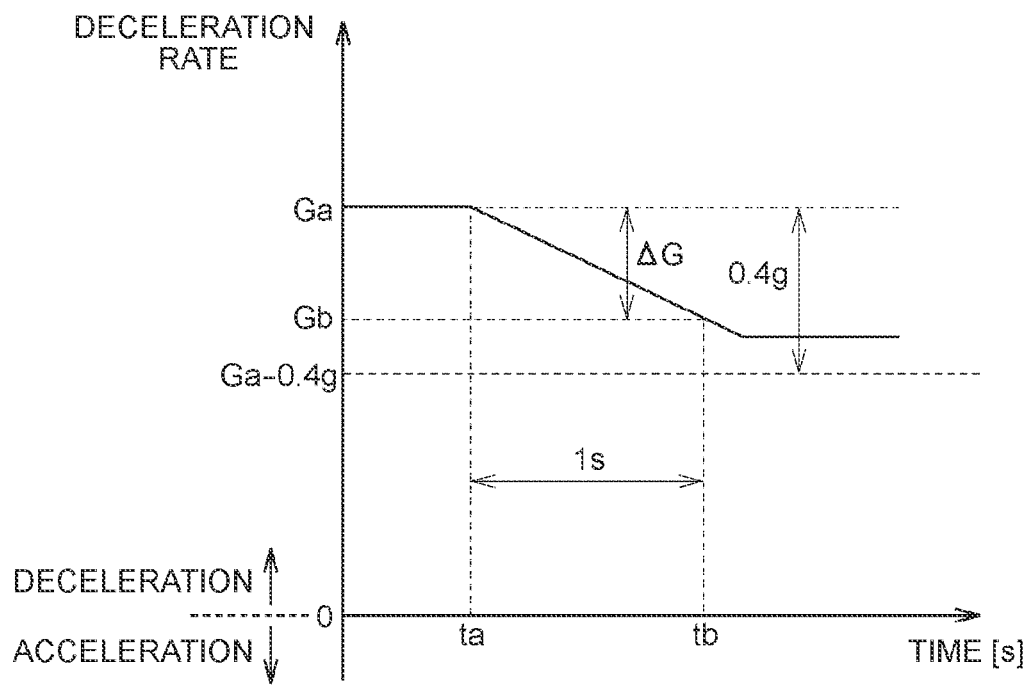
FIG. 4A is a timing chart showing an exemplary validation result for an uncomfortable feeling associated with decrease in regenerative braking force.
Figure 4B:
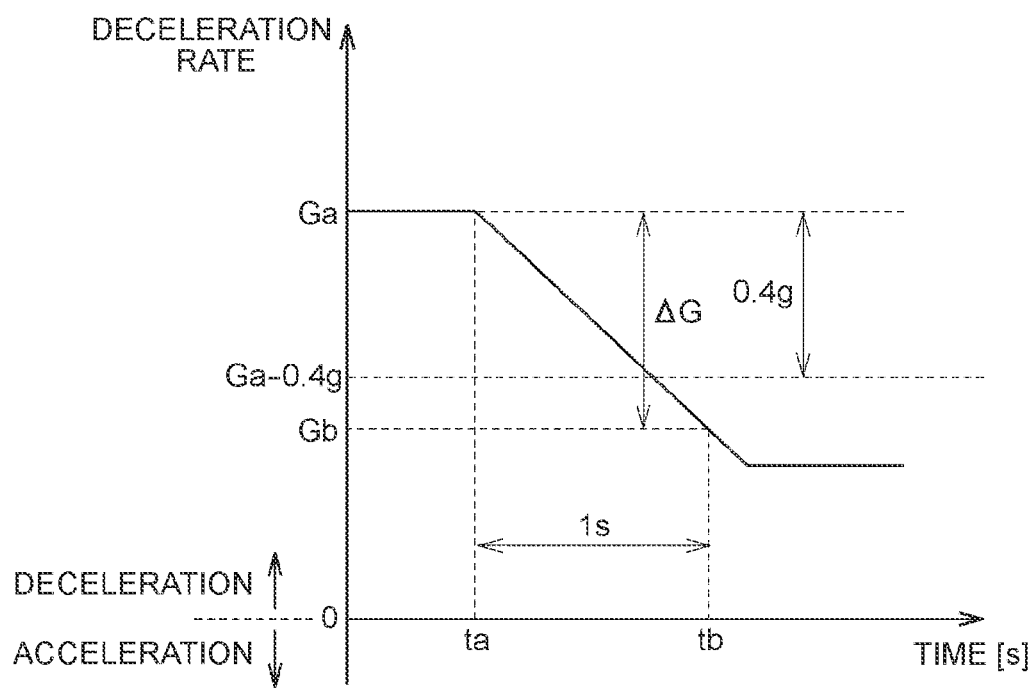
FIG. 4B is a timing chart showing an exemplary validation result for an uncomfortable feeling associated with decrease in regenerative braking force.

FIG. 4A and FIG. 4B are timing charts each of which shows an exemplary validation result for an uncomfortable feeling associated with the decrease in the regenerative braking force. In FIG. 4A and FIG. 4B, the abscissa indicates elapsed time, and the ordinate indicates deceleration. With reference to FIG. 4A and FIG. 4B, until time ta, the deceleration rate is constant at Ga (<0). At time ta, the total braking force starts to decrease, and therefore, the deceleration rate is reduced. Thereafter, by the reduction, the deceleration rate reaches Gb at time tb after 1 second from time ta. The reduction amount of the deceleration rate per unit time (hereinafter, abbreviated to the reduction amount of the deceleration rate) is represented as ΔG (=Ga−Gb).

As the result of the validation, as shown in FIG. 4A, it was found that the uncomfortable feeling associated with the decrease in the regenerative braking force is unlikely to be generated when the reduction amount ΔG of the deceleration rate is less than 0.4 g. Here, "g" is the gravitational acceleration on the earth, and g=9.8 m/s$^2$ holds. On the other hand, as shown in FIG. 4B, it was found that there is a high possibility of giving the user an uncomfortable feeling when the reduction amount ΔG of the deceleration rate is 0.4 g or greater.

Thus, when the regenerative braking force decreases in the middle of the deceleration of the vehicle 1, it is preferable to control the total braking force such that the reduction amount ΔG of the deceleration rate is less than a predetermined value (in the example shown in FIG. 4A and FIG. 4B, less than 0.4 g). Here, the value "0.4 g" is just an example of the validation result, and can be appropriately changed.

<Regeneration Restriction> In the lithium-ion secondary battery, it is known that the lithium metal in the electrolytic solution precipitates on an anode surface when the input electric current is excessive. The precipitation of the lithium metal on the anode surface can occur, also by the regenerative electric power generated during the deceleration of the vehicle. Therefore, in the embodiment, for suppressing the precipitation of the lithium metal by the regenerative electric power, a regeneration restriction of controlling the regenerative electric power by changing the permissible charging electric power value Win is executed. In the following, first, a regeneration restriction in a comparative example will be described, to facilitate the understanding of the regeneration restriction in the embodiment.

Figure 5:
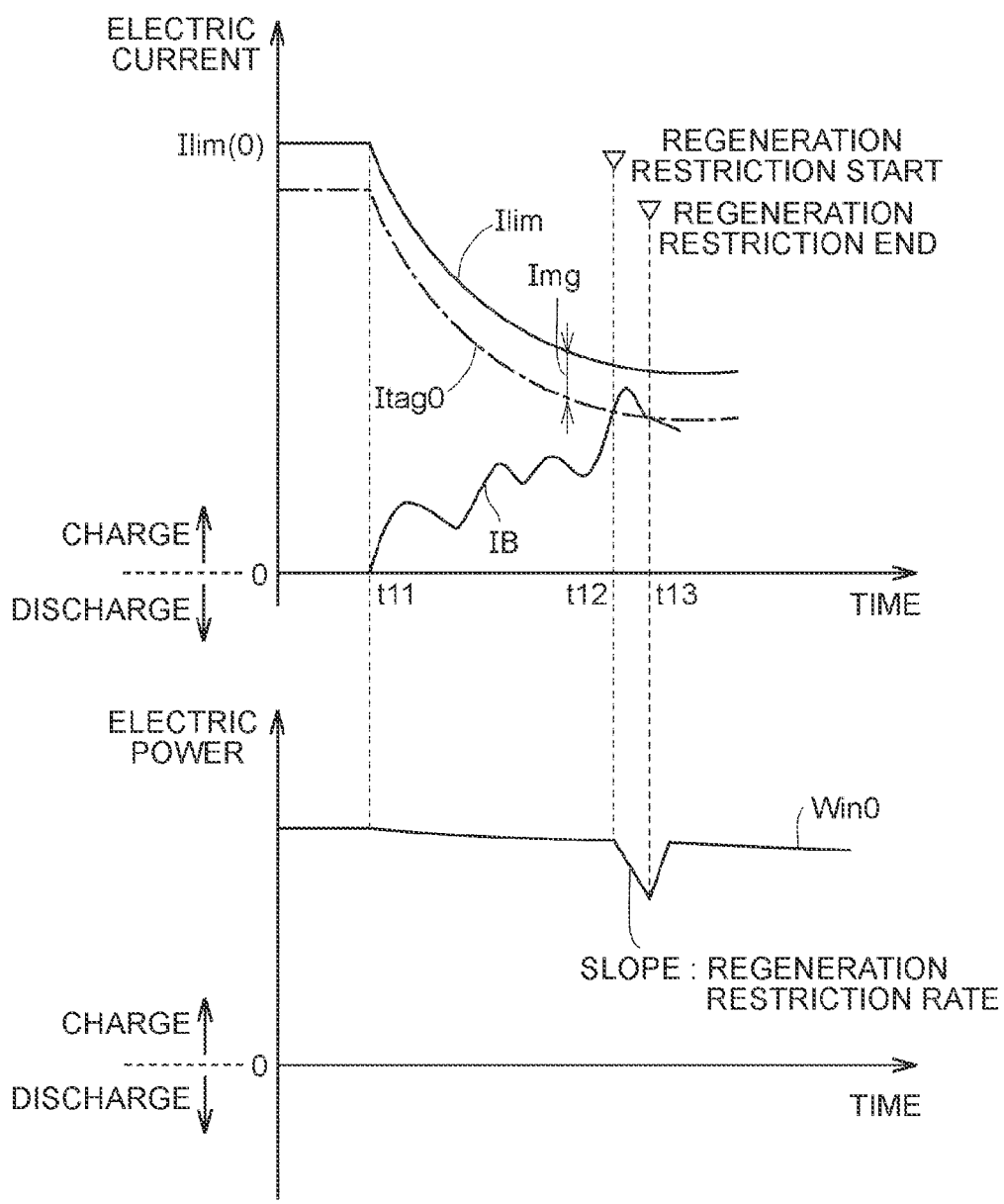
FIG. 5 is a timing chart for describing a regeneration restriction in a comparative example.

FIG. 5 is a timing chart for describing the regeneration restriction in the comparative example. In FIG. 5, the abscissas indicate elapsed time. The ordinates indicate electric current and electric power in order from the top. Here, the configuration of a vehicle according to the comparative example is equivalent to the configuration of the vehicle 1 shown in FIG. 1.

With reference to FIG. 5, at time t11, the charge of the battery 250 is started, so that the input electric current IB increases. At each time t, the feedback control of input electric current IB(t) detected by the current sensor 254 is performed, and thereby, an allowable value Ilim(t) of the input electric current is set. The allowable value Ilim(t) is the maximum electric current that is set such that the electric potential of the anode of the battery 250 does not falls to an electric potential at which the lithium metal can precipitate on the anode.

For suppressing the precipitation of the lithium metal, it is possible that the feedback control is performed such that the input electric current IB does not exceed the allowable value Ilim. However, generally, there is a delay time in feedback control. Accordingly, in such a control, there is a possibility that the input electric current IB temporarily exceeds the allowable value Ilim. Therefore, in consideration of the delay time in feedback control, a restriction target value is calculated from the allowable value Ilim. In the comparative example, at each time t, a predetermined amount of margin Img is added to the allowable value Ilim(t), and thereby, a restriction target value Itag0(t) is calculated.

After time t11, the charge is continued, and the input electric current IB gradually increases while the allowable value Ilim decreases. Consequently, the restriction target value Itag0 also decreases. As a result, the difference value between the input electric current IB and the restriction target value Itag0 becomes smaller than the difference value before the start of the charge.

At time t12, the input electric current IB exceeds the restriction target value Itag (IB≥Itag), and thereby, the regeneration restriction is started. More specifically, the permissible charging electric power value (this is represented as Win0, in the comparative example) of the battery 250 decreases at a fixed rate. In the specification, the rate (the change amount per unit time) is referred to as "regeneration restriction rate". The decrease in the permissible charging electric power value Win0 decreases the charging electric power PB to the battery 250, and therefore, the input electric current IB decreases.

At time t13, the input electric current IB falls below the restriction target value Itag0 again (IB<Itag0). Then, the regeneration restriction is ended, and therefore, the permissible charging electric power value Win0 returns to an ordinary value (a value equivalent to the value before time t1).

In the regeneration restriction described above, the decrease in the charging electric power PB to the battery 250 is actualized by the decrease in the regenerative braking force (see S40 in FIG. 3). The decrease amount of the regenerative braking force is decided depending on the regeneration restriction rate. The regenerative braking force decreases more quickly, as the regeneration restriction rate is set to a higher value. In the case of decreasing the regenerative braking force, it is desirable to increase the fluid pressure braking force by an amount equivalent to the decrease, and thereby, to secure a necessary total braking force (see S50 in FIG. 3). However, a certain amount of time is required for the response of the fluid pressure. Therefore, when the regeneration restriction rate is set to an excessive high value and the regenerative braking force is drastically decreased, there is a possibility that the fluid pressure braking force cannot be increased in time with the decrease in the regenerative braking force. As a result, the total braking force decreases, and when the reduction amount $\Delta G$ of the deceleration rate becomes 0.4 g or greater as described in FIG. 4B, there is a fear of giving the user an uncomfortable feeling.

On the contrary, for suppressing the generation of the above-described uncomfortable feeling, it is possible that the regeneration restriction rate is uniformly set to a low value based on the responsivity of the fluid pressure. The temporal change in the input electric current IB becomes slower, as the regeneration restriction rate is set to a lower value. Therefore, it is necessary to set a larger margin electric current Img, in order to surely avoid the input electric current IB from reaching the allowable value Ilim. However, when the margin electric current Img is set to an excessive large value, the input electric current IB easily reaches the restriction target value Itag0, and therefore, the regeneration restriction is frequently performed. Accordingly, there is a possibility that the energy to be recovered to the battery 250 by regenerative electric power generation is reduced.

Hence, the embodiment employs a configuration in which a regeneration restriction rate P is changed depending on the running situation of the vehicle 1 at the time of the execution of the regeneration restriction (when the input electric current IB exceeds the restriction target value Itag). More specifically, the regeneration restriction rate P is set to a higher value, as the difference value (Itag−IB) increases, or as at least one of vehicle speed decrease amount $\Delta V$ and the charging electric power PB when the detection value IB exceeds the restriction target value Itag increases. In the following, a setting technique for the regeneration restriction rate P in the embodiment will be described in detail.

<Setting of Regeneration Restriction Rate> First, the allowable value Ilim of the input electric current IB is calculated. For example, as shown by the following Formulas (1), (2), the allowable value Ilim(t) at time t can be calculated using the input electric current IB(t) detected by the current sensor 254, a predetermined function f, a allowable value Ilim(t−1) at time (t−1), and an initial value Ilim(0) of the allowable value.

$$Ilim(t)=Ilim(t-1)-f(IB(t))\times dt-\alpha \qquad (1)$$

$$\alpha=\{Ilim(0)-Ilim(t-1)\}/Ilim(0)\times dt \qquad (2)$$

A restriction target value Itag(t) of the input electric current is calculated using the allowable value Ilim(t). The restriction target value Itag(t) can be calculated, for example, by multiplying the allowable value Ilim(t) by a predetermined coefficient $\beta$ (see Formula (3)). Here, for improving readability, "(t)", which shows that the variable is a value at time t, is omitted in the description of each variable shown below.

$$Itag=Ilim\times\beta \qquad (3)$$

Next, internal resistance R of the battery 250 is calculated. Then, open circuit voltage Vocv of the battery 250 is calculated based on the voltage VB, input electric current IB and internal resistance R of the battery 250 (see Formula (4)).

$$Vocv=VB+IB\times R \qquad (4)$$

The voltage Vtag on the assumption that the charge is performed based on the restriction target value Itag is calculated by Formula (3) and Formula (4) (see Formula (5)).

$$Vtag=Vocv-Itag\times R \qquad (5)$$

The regeneration restriction is executed when the input electric current IB reaches or slightly exceeds the restriction target value Itag, and therefore, the input electric current IB can be regarded as being nearly equal to the restriction target value Itag. Accordingly, the charging electric power PB in the execution of the regeneration restriction is expressed by the following Formula (6). The electric power is referred to as base electric power (basic permissible value) Winb.

$$PB=VB\times IB\approx Vtag\times Itag=Winb \qquad (6)$$

The permissible charging electric power value Win [unit: W] is calculated by subtracting an integrated value of the regeneration restriction rate P [unit: W/sec] from the base electric power Winb (see Formula (7)).

$$Win=Winb-\int Pdt \qquad (7)$$

In Formula (7), the regeneration restriction rate P is calculated by multiplying the difference value between the input electric current IB (detection value) and the restriction target value Itag by a coefficient Kp (see Formula (8)).

$$P=Kp\times(Itag-IB) \qquad (8)$$

From a different standpoint from Formula (8), the regeneration restriction rate P, as shown in the following Formula (9), can also be expressed as the product between angular velocity change amount $\Delta\omega p$ [unit: rad/sec] of the propeller shaft 360 associated with the deceleration of the vehicle 1 and torque change amount $\Delta Tp$ [unit: N·m/sec] of the propeller shaft 360 associated with the deceleration of the vehicle 1.

$$P=\Delta\omega p\times\Delta Tp \qquad (9)$$

The angular velocity change amount $\Delta\omega p$ is expressed by the following Formula (10), using change amount $\Delta Np$ [unit: rpm] of the driving wheel rotation speed.

$$\Delta\omega p=2\pi/60\times\Delta Np \qquad (10)$$

On the other hand, the torque change amount $\Delta Tp$ is expressed by the following Formula (11). In Formula (11), "$\Delta F$" represents the change amount [unit: N] of the driving force of the vehicle 1. "M" represents the mass [unit: kg] of the vehicle 1. "$\Delta G$" represents the reduction amount [unit: m/s$^2$] of the deceleration rate of the vehicle 1. "r" represents the radius [unit: m] of the driving wheel 350. "c" represents the gear ratio (differential gear ratio) of the differential gear 370.

$$\Delta Tp = \Delta F \times r/c = Mr/c \times \Delta G \quad (11)$$

By substituting Formula (10) and Formula (11) into Formula (9) and further replacing the constant part (a part fixed as a specification value for the vehicle 1, and the like) with γ, the regeneration restriction rate P is expressed by the following Formula (12).

$$P = 2\pi/60 \times \Delta Np \times Mr/c \times \Delta G = \gamma \times \Delta Np \times \Delta G \quad (12)$$

Thus, the regeneration restriction rate P is expressed, in two ways, by Formula (8) and Formula (12). The right side of Formula (8) and the rightmost side of Formula (12) are equal to each other (see Formula (13)).

$$Kp \times (Itag - IB) = \gamma \times \Delta Np \times \Delta G \quad (13)$$

By substituting Formula (6) into Formula (13) and then solving the formula for the change amount ΔG of the deceleration rate, the following Formula (14) is obtained.

$$\Delta G = Kp \times (Winb/Vtag - IB)/(\gamma \times \Delta Np) \quad (14)$$

As shown by Formula (14), the change amount ΔG of the deceleration rate is decided depending on the coefficient Kp, the base electric power Win the charging electric power PB at the time of the start of the regeneration restriction), and the change amount ΔNp of the driving shaft rotation speed. The change amount ΔNp of the driving shaft rotation speed is proportional to the vehicle speed decrease amount ΔV, and therefore, the change amount ΔG of the deceleration rate is decided depending on the coefficient Kp, the charging electric power PB at the time of the start of the regeneration restriction, and the vehicle speed decrease amount ΔV. Therefore, in the embodiment, the coefficient Kp is set depending on the charging electric power PB and the vehicle speed decrease amount ΔV, such that the reduction amount ΔG of the deceleration rate at the time of the execution of the regeneration restriction is less than 0.4 g. Thereby, it is possible to prevent the generation of an uncomfortable feeling.

Figure 6:
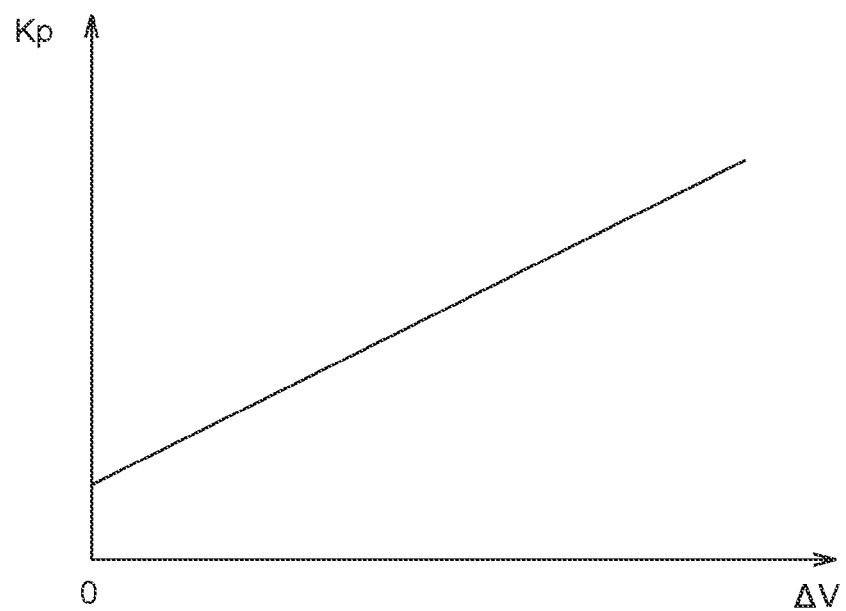
FIG. 6 is a diagram showing an example of the dependency of a coefficient Kp on vehicle speed decrease amount.

FIG. 6 is a diagram showing an example of the dependency of the coefficient Kp on the vehicle speed decrease amount ΔV. In FIG. 6, the abscissa indicates the vehicle speed decrease amount ΔV, and the ordinate indicates the coefficient Kp. As shown in FIG. 6, the coefficient Kp is set to a larger value, as the vehicle speed decrease amount ΔV increases.

As the vehicle speed decrease amount ΔV increases, the regenerative electric power increases, and therefore, the coefficient Kp is set to a larger value, for protecting the battery 250 from the regenerative electric power. Thereby, it is possible to increase the regeneration restriction rate P relatively. In contrast, when the vehicle speed decrease amount ΔV is relatively small, the regenerative electric power is also small, and therefore, the coefficient Kp is set to a smaller value. Thereby, it is possible to decrease the regeneration restriction rate P relatively.

Figure 7:
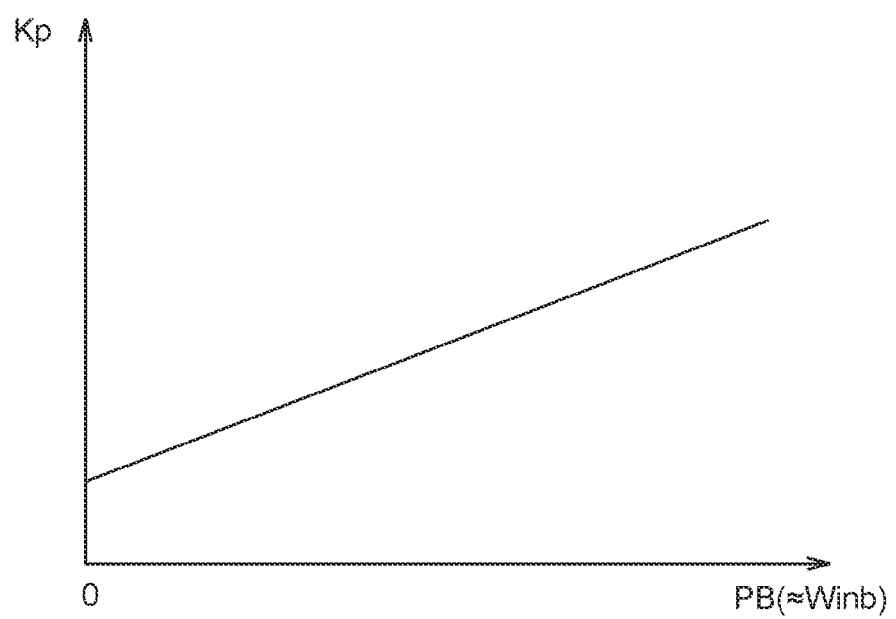
FIG. 7 is a diagram showing an example of the dependency of the coefficient Kp on charging electric power.

FIG. 7 is a diagram showing an example of the dependency of the coefficient Kp on the charging electric power PB. In FIG. 7, the abscissa indicates the charging electric power PB at the time of the start of the regeneration restriction the base electric power Winb), and the ordinate indicates the coefficient Kp. With reference to FIG. 7, the coefficient Kp is set to a larger value, as the charging electric power PB increases.

The difference between the charging electric power PB and the permissible charging electric power value Win decreases, as the charging electric power PB at the time of the start of the regeneration restriction increases. Therefore, from the standpoint of battery protection, the chargeable electric power of the battery 250 decreases. Accordingly, in the embodiment, as the charging electric power PB increases, the coefficient Kp is set to a larger value, and thereby, the regeneration restriction rate P is increased relatively. Here, FIG. 6 and FIG. 7 show examples in which the coefficient Kp increases in a linear manner, but the increasing manner is not particularly limited. For example, the coefficient Kp may increase in a curve manner or in a stepwise manner.

Figure 8:
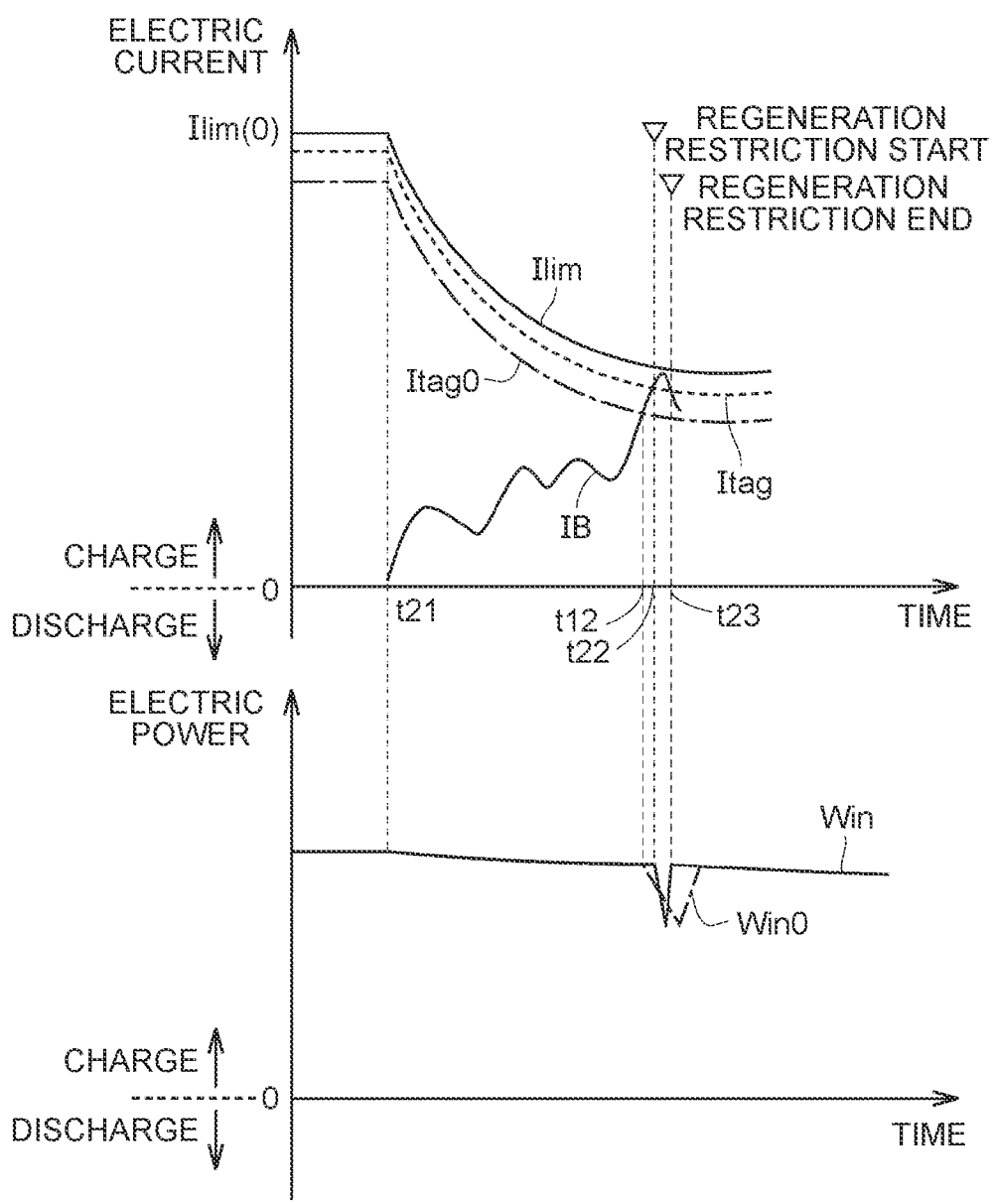
FIG. 8 is a timing chart for describing a regeneration restriction in the embodiment.

FIG. 8 is a timing chart for describing the regeneration restriction in the embodiment. With reference to FIG. 8, for the comparison with the comparative example (see FIG. 5), a case where the behavior of the input electric current IB is the same between the embodiment and the comparative example will described. The restriction target value in the embodiment is shown by Itag (see a broken line), and the restriction target value in the comparative example is shown by Itag0 (see a chain line). Further, the permissible charging electric power value in the embodiment is shown by Win (see a solid line), and the permissible charging electric power value in the comparative example is shown by Win0 (see a chain line).

In the comparative example, it has been described that the regeneration restriction rate is a fixed value. On the other hand, in the embodiment, there is described a case where the regeneration restriction rate is set to a higher value than that in the comparative example, based on the running situation of the vehicle 1 (specifically, based on the vehicle speed decrease amount ΔV and the charging electric power PB).

Even when the restriction target value Itag is large and therefore the difference between the restriction target value Itag and the allowable value Ilim is small, it is possible to prevent the input electric current IB from reaching the allowable value Ilim, if the regeneration restriction rate P is sufficiently high. Therefore, according to the embodiment, it is possible to set the restriction target value to a larger value, compared to the comparative example. Accordingly, start time t22 for the regeneration restriction in the embodiment is later than start time t12 for the regeneration restriction in the comparative example. That is, in the embodiment, the execution period of the regeneration restriction is shortened, compared to the comparative example. Thereby, it is possible to recover a larger regenerative electric power to the battery 250.

FIG. 9 is a flowchart for describing the regeneration restriction in the embodiment. With reference to FIG. 9, in S110, the ECU 300 calculates the internal resistance R of the battery 250. As the calculation technique for the internal resistance, a known technique can be applied, and therefore, the detailed description is not repeated.

In S120, the ECU 300 calculates the allowable value Ilim of the input electric current. Specifically, to the initial value Ilim(0) of the permissible value, the ECU 300 adds the decrease amount of the allowable value by charge continuation, and the recovery amount of the allowable value by discharge continuation or charge/discharge stop, in a control cycle (see Formulas (1), (2)). Thereby, it is possible to successively evaluate Ilim(t) at time t.

In S130, the ECU 300 calculates the restriction target value Itag, from the allowable value Ilim of the input electric current. As described in Formula (3), the restriction target value Itag is calculated by multiplying the allowable value Ilim by the coefficient β. Here, as the coefficient β, for example, a value for which the degradation by the charge/discharge of the battery 250 or the time degradation of the battery 250 is considered can be used.

In Formula (3), a correction term of an offset component Ioff may be added, in consideration of the detection error of the current sensor 254 (see the following Formula (3A)). The offset component Ioff is different from the margin electric current Img (see FIG. 5), which is set in consideration of the delay time in the feedback control.

$$Itag = Ilim \times \beta Ioff \quad (3A)$$

Here, at the time of the charge, it is likely that the heat from the battery 250 reaches the current sensor 254. The current sensor 254 has temperature characteristic, and therefore, there is a possibility that the detection error increases by the influence of the heat. For correcting the detection error, it is desirable to consider the temperature of the current sensor 254, in addition to the temperature TB of the battery 250. The amount of the heat generation of the battery 250 depends on the SOC, and therefore, the detection error of the current sensor 254 depends on the SOC of the battery 250. Accordingly, the offset component Ioff may be set based on the temperature TB and SOC of the battery 250, in addition to the detection error of the current sensor 254.

In S140, the ECU 300 calculates the open circuit voltage Vocv of the battery 250, and calculates the voltage Vtag using the calculation result (Formulas (4), (5)).

In S150, the ECU 300 calculates the base electric power Winb of the battery 250, based on the restriction target value Itag and the voltage Vtag (see Formula (6)).

In S160, the ECU 300 determines whether the input electric current IB detected by the current sensor 254 is the restriction target value Itag or greater. In the case where the input electric current IB is less than the restriction target value Itag (NO in S160), the ECU 300 does not need to execute the regeneration restriction. Therefore, the process proceeds to S220. In S220, the ECU 300 sets the base electric power Winb as the permissible charging electric power value Win.

On the other hand, in the case where the input electric current IB is the restriction target value Itag or greater (YES in S160), there is a possibility that the input electric current IB reaches the allowable value Ilim. Therefore, the process proceeds to S170, and the ECU 300 executes the regeneration restriction.

In S170, the ECU 300 calculates the vehicle speed decrease amount ΔV, based on ΔNp of the driving wheel rotation speed from the speed sensor 362.

In S180, the ECU 300 calculates the charging electric power PB (=IB×VB) of the battery 250. At the time point of this process, the input electric current IB is nearly equal to the restriction target value Itag, and also the voltage VB is nearly equal to the voltage Vtag. Accordingly, the charging electric power PB can be regarded as being equal to the base electric power Winb (=Itag×Vtag).

In S190, the ECU 300 calculates the coefficient Kp. For example, a map showing a correspondence relation of the vehicle speed decrease amount ΔV, the charging electric power PB (the base electric power Winb) and the coefficient Kp is stored in a memory (not illustrated) of the ECU 300. The ECU 300 refers to the map, and thereby, calculates the coefficient Kp from the vehicle speed decrease amount ΔV and the charging electric power PB. Here, a computing equation or a function may be used, instead of the map.

In S200, the ECU 300 calculates the regeneration restriction rate P, by multiplying the difference value (Itag−IB) between the restriction target value Itag of the input electric current and the detection value IB of the current sensor 254 by the coefficient Kp (see Formula (8)).

In S210, the ECU 300 calculates the permissible charging electric power value Win, by subtracting the integrated value of the regeneration restriction rate P from the base electric power Winb (see Formula (7)).

Thus, according to the embodiment, the coefficient Kp is calculated based on the vehicle speed decrease amount ΔV and the charging electric power PB (the base electric power Winb). Thereby, it is possible to set the regeneration restriction rate P depending on the running situation of the vehicle 1. Specifically, the regeneration restriction rate P is set to a higher value, as the difference value (Itag−IB) increases, or as at least one of the vehicle speed decrease amount ΔV and the charging electric power PB when the detection value IB exceeds the restriction target value Itag increases. Therefore, compared to the configuration of setting the margin electric current Img as described in the comparative example, it is possible to prevent the input electric current IB from reaching the permissible value Ilim, even when the restriction target value Itag of the input electric current is set to a large value, and it is possible to recover a larger regenerative electric power to the battery 250. Further, by calculating the coefficient Kp as described above, the reduction amount ΔG of the deceleration rate associated with the regeneration restriction is suppressed to less than a fixed value, and therefore, it is possible to prevent the generation of an uncomfortable feeling.

It should be understood that the embodiment disclosed herein is an example and is not limiting in all respects. It is intended that the scope of the invention is shown by not the above-described description but the claims, and includes all modifications in a meaning and scope equivalent to the claims.

What is claimed is:

1. A control apparatus for a vehicle, wherein the vehicle includes a rotating electric machine to generate regenerative electric power by regenerative braking, a battery configured to be chargeable with the regenerative electric power from the rotating electric machine, and a current sensor to detect input and output electric current for the battery, the control apparatus comprising:

an electronic control unit configured to:
i) calculate a restriction target value of input electric current to the battery depending on a detection value of the current sensor, in a charge control operation of charging the battery such that charging electric power to the battery is below a permissible value,
ii) calculate a voltage value of the battery when the battery is charged based on the restriction target value, in a case where the detection value exceeds the restriction target value,
iii) calculate a basic permissible value of the charging electric power to the battery, from the restriction target value and the voltage value,
iv) set a regeneration restriction rate to a higher value, as a difference value between the restriction target value and the detection value increases, or as at least one of vehicle speed and the charging electric power increases when the detection value exceeds the restriction target value, the regeneration restriction rate being a change amount of the permissible value per unit time at a time of the regenerative braking,
v) calculate a coefficient based on the charging electric power when the detection value exceeds the restriction target value, and the vehicle speed, vi) calculate a multiplied value of the coefficient and the difference value, as the regeneration restriction rate, vii) calculate the permissible value based on the basic permissible value and the multiplied value, and viii) set the coefficient such that a reduction amount of a deceleration rate per unit time of the vehicle is below a predetermined value, when the deceleration rate of the vehicle is reduced by decreasing the regenerative braking force of the rotating electric machine in a case where the detection value exceeds the restriction target value at a time of deceleration of the vehicle.

2. A control method for a vehicle, wherein the vehicle includes a rotating electric machine to generate regenerative electric power by regenerative braking, a battery configured to be chargeable with the regenerative electric power from the rotating electric machine, a current sensor to detect input and output electric current for the battery, and an electronic control unit, the control method comprising:

i) calculating, by the electronic control unit, a restriction target value of input electric current to the battery depending on a detection value of the current sensor, in a charge control operation of charging the battery such that charging electric power to the battery is below a permissible value;

ii) calculating, by the electronic control unit, a voltage value of the battery when the battery is charged based on the restriction target value, in a case where the detection value exceeds the restriction target value;

iii) calculating, by the electronic control unit, a basic permissible value of the charging electric power to the battery, from the restriction target value and the voltage value;

iv) setting, by the electronic control unit, a regeneration restriction rate to a higher value, as a difference value between the restriction target value and the detection value increases, or as at least one of vehicle speed and the charging electric power increases when the detection value exceeds the restriction target value, the regeneration restriction rate being a change amount of the permissible value per unit time at a time of the regenerative braking, v) calculating a coefficient based on the charging electric power when the detection value exceeds the restriction target value, and the vehicle speed;

vi) calculating a multiplied value of the coefficient and the difference value, as the regeneration restriction rate;

vii) calculating the permissible value based on the basic permissible value and the multiplied value; and viii) setting the coefficient such that a reduction amount of a deceleration rate per unit time of the vehicle is below a predetermined value, when the deceleration rate of the vehicle is reduced by decreasing the regenerative braking force of the rotating electric machine in a case where the detection value exceeds the restriction target value at a time of deceleration of the vehicle.

* * * * *